(12) United States Patent
Mishra et al.

(10) Patent No.: US 7,774,760 B2
(45) Date of Patent: Aug. 10, 2010

(54) TRACING ERRORS IN SOFTWARE

(75) Inventors: Rajat Mishra, Redmond, WA (US); NK Srinivas, Sammamish, WA (US); Alan T. G. Jowett, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1264 days.

(21) Appl. No.: 11/318,215

(22) Filed: Dec. 23, 2005

(65) Prior Publication Data

US 2007/0234305 A1  Oct. 4, 2007

(51) Int. Cl.
*G06F 9/44* (2006.01)
*G06F 11/00* (2006.01)

(52) U.S. Cl. ................ 717/128; 717/130; 717/131; 714/38; 714/100

(58) Field of Classification Search ........... 717/124, 717/128, 130, 131, 168; 714/38, 100
See application file for complete search history.

(56) References Cited

U.S. PATENT DOCUMENTS

| | | | |
|---|---|---|---|
| 5,450,586 A * | 9/1995 | Kuzara et al. ............... 717/124 |
| 5,896,536 A * | 4/1999 | Lindsey ...................... 717/128 |
| 6,083,281 A | 7/2000 | Diec et al. |
| 6,351,843 B1 * | 2/2002 | Berkley et al. .............. 717/128 |
| 6,513,154 B1 | 1/2003 | Potterfield |
| 6,754,348 B1 | 6/2004 | Chung et al. |
| 6,754,888 B1 | 6/2004 | Dryfoos et al. |
| 6,944,797 B1 * | 9/2005 | Guthrie et al. ................ 714/45 |
| 7,058,927 B2 * | 6/2006 | Yenne et al. ................ 717/128 |
| 7,219,125 B1 * | 5/2007 | Day .......................... 717/170 |
| 7,380,239 B1 * | 5/2008 | Srivastava et al. ........... 717/128 |
| 2001/0039650 A1 | 11/2001 | Bodo |
| 2002/0066080 A1 * | 5/2002 | O'Dowd .................... 717/128 |
| 2003/0005414 A1 * | 1/2003 | Elliott et al. ................ 717/128 |
| 2003/0046614 A1 | 3/2003 | Brokish |
| 2005/0091642 A1 | 4/2005 | Miller |
| 2005/0149750 A1 | 7/2005 | Lisanke |
| 2006/0200806 A1 * | 9/2006 | Tasinga ..................... 717/128 |

OTHER PUBLICATIONS

Berndl et al., "Dynamic Profiling and Trace Cache Generation", IEEE, 2003, 10pg.*
Gibbons et al., "Tracing Lazy Functional Languages", CATS'96, Jan. 30, 1996, 10pg.*
"Can we prove that a million line program is free of errors?", [http://www.microsoft.com/windows/cse/pa/esp.msbx], (2005),2 pages.
"Dynamic Code Coverage", [http://www.dynamic-memory.com/coverageanalysis.php], (2005), 1 page.
"Executable assertions and timed traces for on-line software error detection", [http://scdl2.computer.org/persagen/DLAbsToc.jsp?resourcePath=/dl/proceedings/&toc=comp/proceedings/ftcs/1996/7261toc.xml&DOI=10.1109/FTCS.1996.534602], (2005),2 pages.

* cited by examiner

*Primary Examiner*—Wei Y Zhen
*Assistant Examiner*—Ryan D Coyer

(57) ABSTRACT

An error tracing analysis tool applies static code analysis to software source code to identify error paths in the code and determine how many of these error paths have trace statements.

8 Claims, 6 Drawing Sheets

```
1    HRESULT FunctionA(parameters);
2    HRESULT FunctionB(parameters);
3    HRESULT FunctionC(parameters);
4
5    HRESULT FunctionA(parameters)
6    {
7    ... other code ...
8    HRESULT hr = S_OK;
9    hr = FunctionB(someParameters);
10   if (hr != S_OK)
11       {
12       ... other code ...
13       TRACE("FunctionB failed with error %D", hr);
14       ... other code ...
15       return hr;
16       }
17   ... other code ...
18   return S_OK;
19   }
20
21   HRESULT FunctionB(parameters)
22   {
23   ... other code ...
24   HRESULT hr = S_OK;
25   hr = FunctionC(parameters);
26   if (hr != S_OK)
27       {
28       ... other code ...
29       return E_FAIL;
30       }
31   ... other code ...
32   return S_OK;
33   }
34
35   HRESULT FunctionC(parameters)
36   {
37   ... other code ...
38   if (some condition)
39       {
40       return E_INVALID_PARAM;
41       }
42   ... other code ...
43   }
```

FIG. 2

TRACING ERRORS IN SOFTWARE

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2005, Microsoft Corporation, All Rights Reserved.

BACKGROUND

It is often difficult to determine the root cause of an error in complex multilayered software. In some situations, upper layers of software abstract the details of the errors caused by lower layers and present a more user-friendly output to the person using the software. This abstraction of failures makes diagnosing the exact cause of the error difficult.

One of the technologies that can be used to counteract this loss of information due to abstraction of errors is tracing. Optional trace statements (for example, calls to the application programming interface (API) of a tracing tool) are embedded in the code to record the error at each layer in the software, thus creating a trace of the errors across the cross-section of the multilayered software. This trace may be used to better understand the error and to rapidly determine the root cause.

However, if an error occurs in a portion of the software which lacks trace statements, the root cause of the error may not be clear to the person analyzing the problem.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Tracing helps people understand what a software program is doing by showing how the program is executed. It is good practice for a programmer to add tracing statements (for example, calls to the application programming interface (API) of a tracing tool) to the software code of the program. If the tracing is enabled while the program is running, the trace statements will output trace messages to a debugger or to a log file.

A software function may return a value to the function that called it. If a called function behaves as intended, it may return a value to indicate the success of the called function. However, if the called function does not behave as intended, it may return a value that indicates that an error has occurred.

An error tracing analysis tool applies static code analysis to software source code to identify error paths in the code and determine how many of these error paths have trace statements. Recommendations to include trace statements in error paths that are identified as lacking trace statements may be made. Trace statements may be automatically inserted in error paths that are identified as lacking trace statements.

Trace statements that identify the reason for the error provide more information than trace statements that merely indicate that an error has occurred. The quality of error tracing in the code may be quantified based on the percentage of error paths having trace statements that identify the reason for the error and/or the percentage of error paths having trace statements of any kind. These and similar quantifications may be used to compare the quality of error tracing in different pieces of code.

BRIEF DESCRIPTION OF THE DRAWINGS

Embodiments are illustrated by way of example and not limitation in the figures of the accompanying drawings, in which like reference numerals indicate corresponding, analogous or similar elements, and in which:

FIG. 2 is an exemplary sample of software code, helpful in understanding embodiments of the invention;

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the invention. However it will be understood by those of ordinary skill in the art that the embodiments may be practiced without these specific details. In other instances, well-known methods, procedures and components have not been described in detail so as not to obscure the embodiments of the invention.

According to some embodiments of the invention, an error tracing analysis tool applies static code analysis to software source code to identify error paths in the code and determine which, if any, of these error paths have trace statements. In one example, an error path is defined as starting a point in the code where an error could be returned from a function called by the current function and as ending either where the error is returned by the current function or at the start of another error path that starts before the error is returned by the current function.

A non-exhaustive list of examples of trace statements includes statements that print a trace message to an output file or a printer, calls to the application programming interface (API) of a tracing tool, and statements that log the error in a circular buffer in the memory.

The error tracing analysis tool may make recommendations to include trace statements in error paths that are identified as lacking trace statements. For example, the error tracing analysis tool may produce output that identifies the starting points of error paths that lack trace statements. A software engineer may then add trace statements to the software source code. Trace statements may be automatically inserted in error paths that are identified as lacking trace statements. The automatic insertion of trace statements may be performed by the error tracing analysis tool or by another tool that makes use of the output of the error tracing analysis tool.

Trace statements that identify the particular error that has occurred provide more information than trace statements that merely indicate that an error has occurred. The quality of tracing in the code may be quantified based on the percentage of error paths having trace statements that identify the error and/or the percentage of error paths having trace statements of any kind. These and similar quantifications may be used to compare the quality of tracing in different pieces of code.

Figure 1:
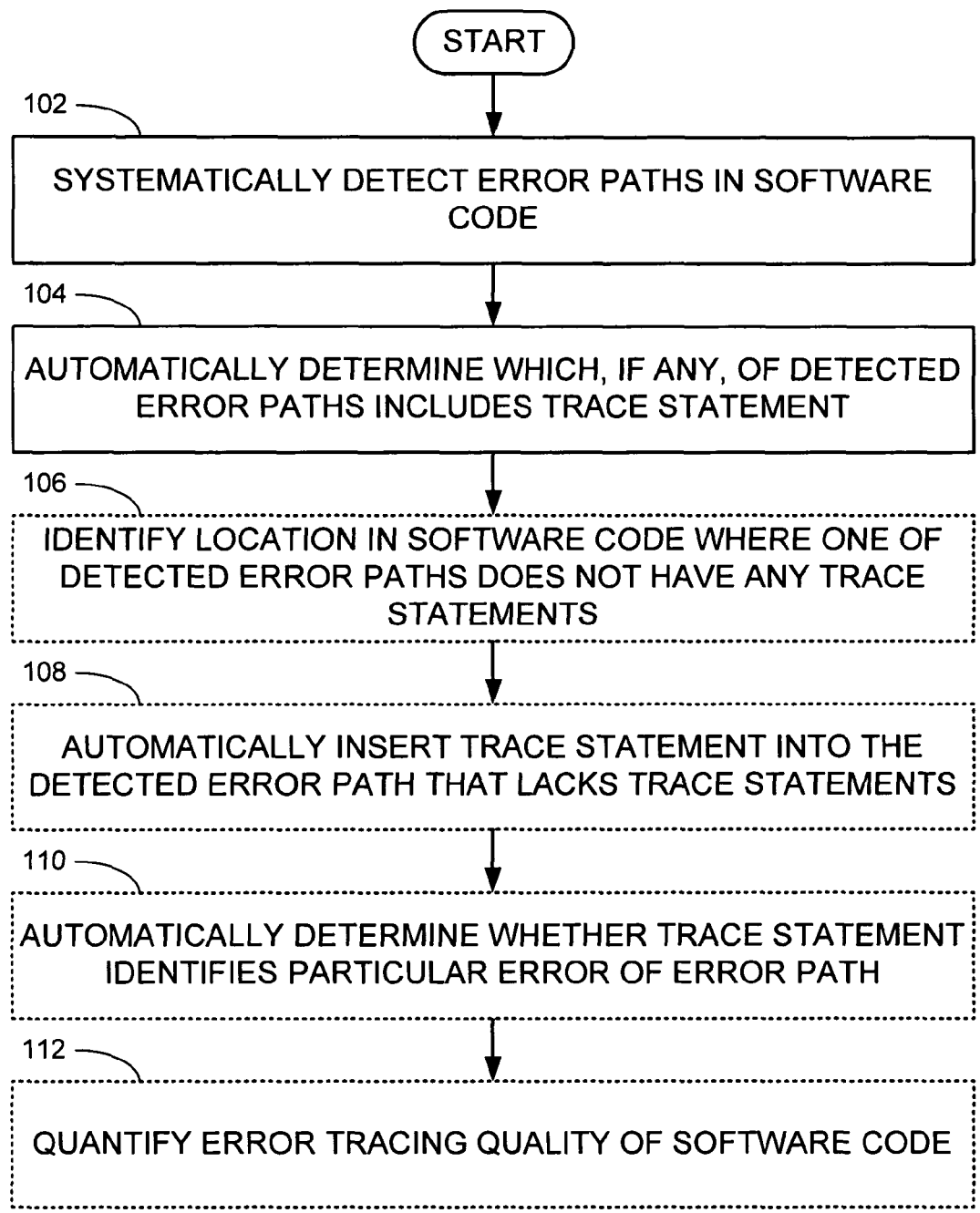
FIG. 1 is a flowchart of a method to measure trace statements in error paths of software code, according to some embodiments of the invention.

FIG. 1 is a flowchart of a method to measure trace statements in error paths of software code, according to some embodiments of the invention. The method may be implemented by an error tracing analysis tool such as that described below with respect to FIG. 3.

At 102, the tool systematically detects error paths in the software code using static code analysis. For example, this systematic detection may include matching code constructs in the software code to predefined patterns.

In one specific example, the OPAL functional programming language, an informal specification of which is found at http://www.cs.oberlin.edu/~jwalker/opal/spec/, was used to define the following patterns for the start of error paths:

```
pattern p_FunctionReturnedNtStatus
    {CALL function RETURNS:$1} and
        function:TYPE:RETURNS:TYPESYMBOL:NAME:"NTSTATUS"
        where {NE $1 0};
pattern p_FunctionReturnedHresultError
    {CALL function RETURNS:$1} and
        function:TYPE:RETURNS:TYPESYMBOL:NAME:"HRESULT"
        where {NE $1 0};
pattern p_FunctionReturnedDWORD
    {CALL function RETURNS:$1}
        and function:TYPE:RETURNS:TYPESYMBOL:NAME:"DWORD"
        where {NE $1 0};
pattern p_FunctionReturnedInt
    {CALL function RETURNS:$1}
        and function:TYPE:RETURNS:TYPESYMBOL:NAME:"int"
        where {NE $1 0};
pattern p_FunctionReturnedHANDLE
    {CALL function RETURNS:$1}
        and function:TYPE:RETURNS:TYPESYMBOL:NAME:"HANDLE"
        where {NE $1 -1};
```

These error path start patterns are matched if a function is called that returns a value of a specified type and the value is not equal to the return value that indicates no error.

The OPAL language was used to define the following pattern for the end of an error path:

```
pattern p_Exit
    {EXIT};
```

At 104, the tool automatically determines, using static code analysis, which, if any, of those error paths detected at 102 that include at least one trace statement. Again, this may be accomplished by matching code constructs in the software code to predefined patterns. To continue the specific OPAL-based example, the following patterns may be used to define and recognize a trace statement:

```
pattern p_Trace
    {CALL /\?WPP_SF_/ ___ $1} or
    {CALL /\?WPP_SF_/ ____ $1};
pattern p_TraceNoError
    {CALL /\?WPP_SF_/ } or
    {CALL TraceEvent } or
    {CALL TraceEventInstance } or
    {CALL TraceMessage } or
    {CALL TraceMessageVa } or
    {CALL EventWriteTransfer } or
    {CALL EventWrite } or
    {CALL EventWriteString } or
    {CALL EtwWrite } or
    {CALL EtwWriteString };
```

The p_Trace pattern is matched if a function the name of which includes WPP_SF_ is called that returns a value. The p_TraceNoError pattern is matched if a function the name of which includes WPP_SF_ is called that does not return a value or if a function with one of the other names listed above is called. WPP is an acronym for Windows® software trace processor.

At 106, the tool identifies the location in the software code of an error path detected at 102 and not identified at 104 as including at least one trace statement. For example, this location may be identified by code line number, and may be provided to the user of the tool via a suitable output such as a log file. The output is effectively a recommendation to the user to insert at least one trace statement in the software code in the detected error path that currently lacks trace statements. The identification of locations of error paths that lack trace statements may be performed for one or more of such error paths in the software code.

At 108, the tool automatically inserts a trace statement into the detected error path that does not include at least one trace statement. The inserted trace statement may be a simple trace statement that merely indicates that an error occurred. Alternatively, the inserted trace statement may identify the particular error that has occurred.

The identification of the locations is optional and may depend upon the implementation and/or configuration of the tool. The automatic insertion of trace statements is optional and may depend upon the implementation and/or configuration of the tool.

At 110, the tool automatically determines, using static code analysis, whether the trace statements identified at 104 identify the particular error of the detected error path. This determination may occur at 104 as part or all of the process of automatically determining which, if any, of the detected error paths includes at least one trace statement. Alternatively, the automatic determination at 110 may be a secondary process that further filters the trace statements detected at 104.

The determination of whether a trace statement indicates the particular error of the detected error path is optional and may depend upon the implementation and/or configuration of the tool.

The tool may quantify an error tracing quality of the software code at 112. In one example, this quantification is based on a total number of detected error paths detected at 102, and on a number of the detected error paths that are determined at 104 to include at least one trace statement. In another example, this quantification is based on a total number of detected error paths detected at 102, and on a number of the detected error paths that are determined at 110 to include at least one trace statement that identifies the particular error. Other suitable quantifications of an error tracing quality are also possible. The error tracing quality of different pieces of software code can be compared using any of these quantifications.

Some embodiments of the invention may be described in the general context of computer-executable instructions, such as program modules, executed by one or more computers or other devices. Generally, program modules include routines, programs, functions, dynamic linked libraries (DLLs), applets, native instructions, objects, components, data structures, etc. that perform particular tasks or implement particular abstract data types. Typically the functionality of the program modules may be combined or distributed as desired in various embodiments.

FIG. 2 is an exemplary sample of software code, helpful in understanding embodiments of the invention. In this sample, there is an error path from line 9, where FunctionB (the "called function") could potentially return an error, to line 15, where an error value is returned by FunctionA (the "current function"). There is a trace statement in this error path at line 13. In fact, the trace statement at line 13 identifies the particular error, because it identifies the error value hr in the output string.

There is another error path from line 25, where FunctionC (the "called function") could potentially return an error, to line 29, where an error value is returned by FunctionB (the "current function"). There is no trace statement in this error path.

Figure 3:
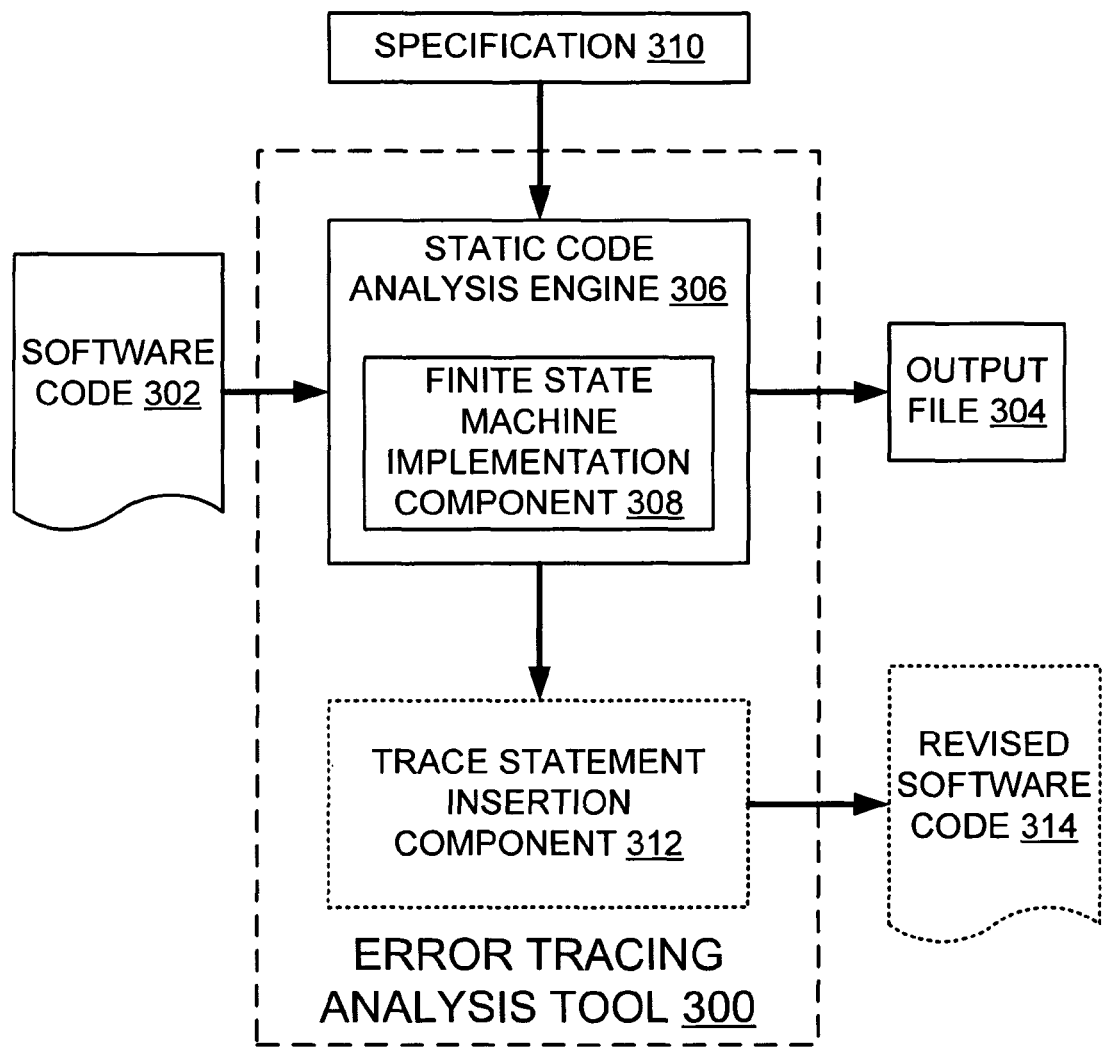
FIG. 3 is a functional block diagram of an error tracing analysis tool, according to some embodiments of the invention.

FIG. 3 is a functional block diagram of an exemplary error tracing analysis tool 300, according to some embodiments of the invention. Software code 302 to be analyzed by tool 300 is provided as input to the tool. An output file 304 receives output of tool 300, as explained in further detail below. The information provided to output file 304 may be provided, in addition or alternatively, to a debugger (not shown).

Tool 300 comprises a static code analysis engine 306. A non-exhaustive list of examples for static code analysis engine 306 includes Lint, PREfast, PREfix and the like.

In some embodiments, static code analysis engine 306 comprises a component 308 to implement a finite state machine. Examples of finite state machines to be implemented by component 308 are described below with respect to FIGS. 4 and 5.

A specification 310 is provided to static code analysis engine 306 to configure its behavior. For example, specification 310 may specify the code constructs to be identified by static code analysis engine 306 and the states, events and transitions of the finite state machine to be implemented by component 308.

Tool 300 may optionally comprise a component 312 for automatic trace statement insertion. Component 312 may use the locations of detected error paths that lack trace statements to determine where in software code 302 to insert trace statements. The output of component 312 is a revised software code 314 that includes the inserted trace statements.

Figure 4:
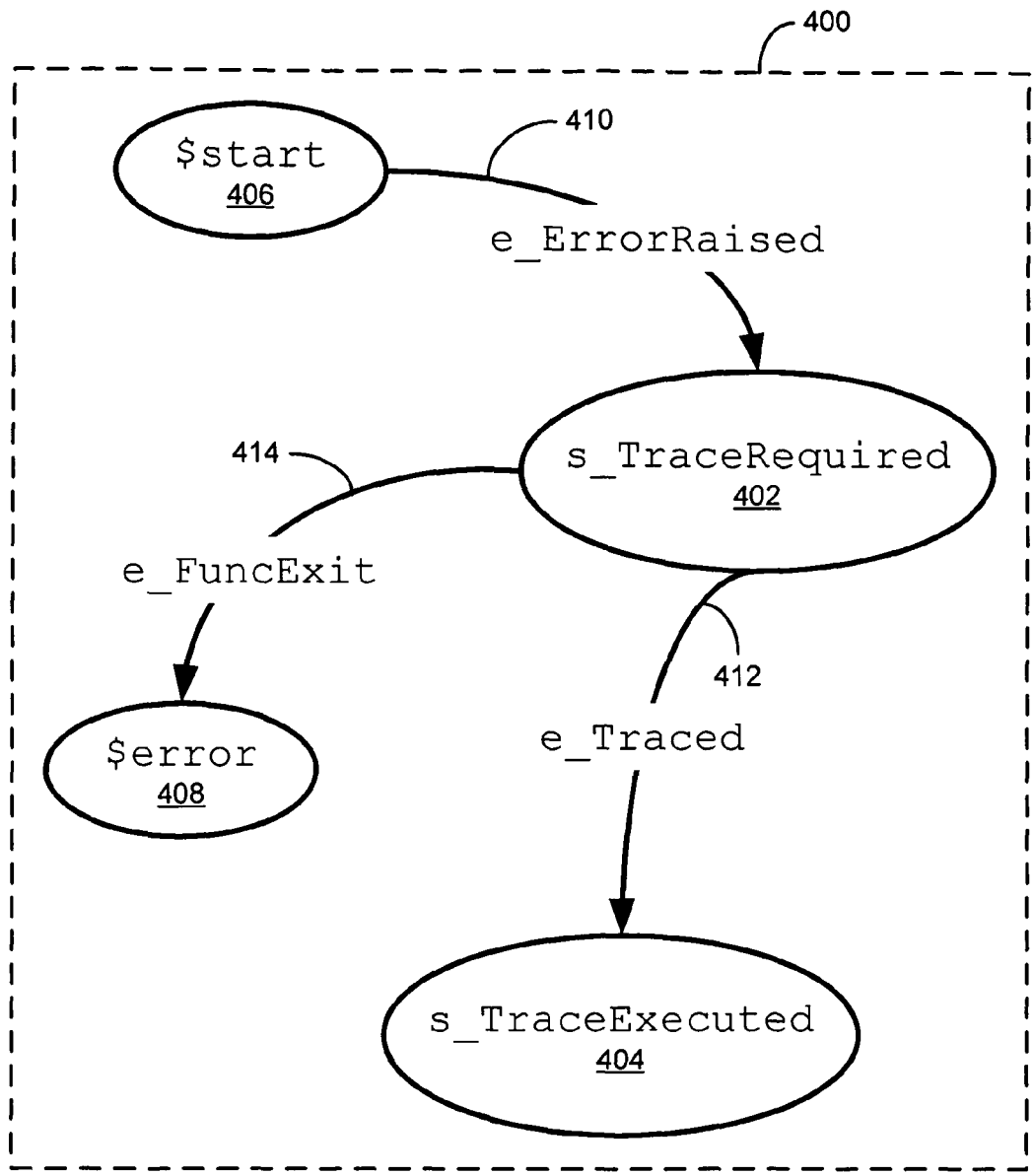
FIG. 4 is a graph of a finite state machine to be implemented by a component of the tool of FIG. 3, according to an embodiment of the invention.

FIG. 4 is a graph of a finite state machine 400 to be implemented by component 308, according to an embodiment of the invention. State machine 400 consists of four states: two explicit states s_TraceRequired 402 and s_TraceExecuted 404 and two implicit states $start 406 and $error 408. There are three events: e_ErrorRaised, e_Traced, and e_FuncExit.

When none of the three events have been detected, the state machine is in its initial state, $start. When the e_ErrorRaised event is detected, there is a transition 7410 from the $start state 406 to the s_TraceRequired state 402, and a logging message indicative of or describing this transition, for example, "Error Raised", is output to file 304.

In the s_TraceRequired state 402, there is a condition that would require tracing. For example, a function called by the current function has returned an error. There is a transition 412 from the s_TraceRequired state 402 to the s_TraceExecuted state 404 when the e_TraceCalled event is detected, and a logging message indicative of or describing this transition, for example, "Trace Executed", is output to file 304. There is a transition 414 from the s_TraceRequired state 402 to the $error state 408 when the e_FuncExit event is detected, and a logging message indicative of or describing this transition, for example, "No tracing of error!", is output to file 304.

The s_TraceExecuted state 404 is a terminal state, which causes the static code analysis engine to halt the processing for this state machine.

The $error state 408 represents a situation where an error path has been detected, but no trace statements in that error path have been detected.

To continue the specific OPAL-based example, specification 310 may include, in addition to the pattern definitions given above, the following definition of finite state machine 400:

```
statemachine Tracing {
    state s_TraceRequired;
    state s_TraceExecuted terminal;
    event e_ErrorRaised patterns  p_FunctionReturnedNtStatus($1)
        p_FunctionReturnedHresultError($1)
        p_FunctionReturnedDWORD($1)
        p_FunctionReturnedHANDLE($1)
        creation;
    event e_Traced patterns p_Trace($1) p_TraceNoError( ) ;
    event e_FuncExit patterns p_Exit( ) $mainonly;
    transition $start to s_TraceRequired on e_ErrorRaised with "Error Raised";
    transition s_TraceRequired to s_TraceExecuted on e_Traced with "Trace Executed";
    transition s_TraceRequired to $error on e_FuncExit with "No error logging! " ;
};
```

Figure 5:
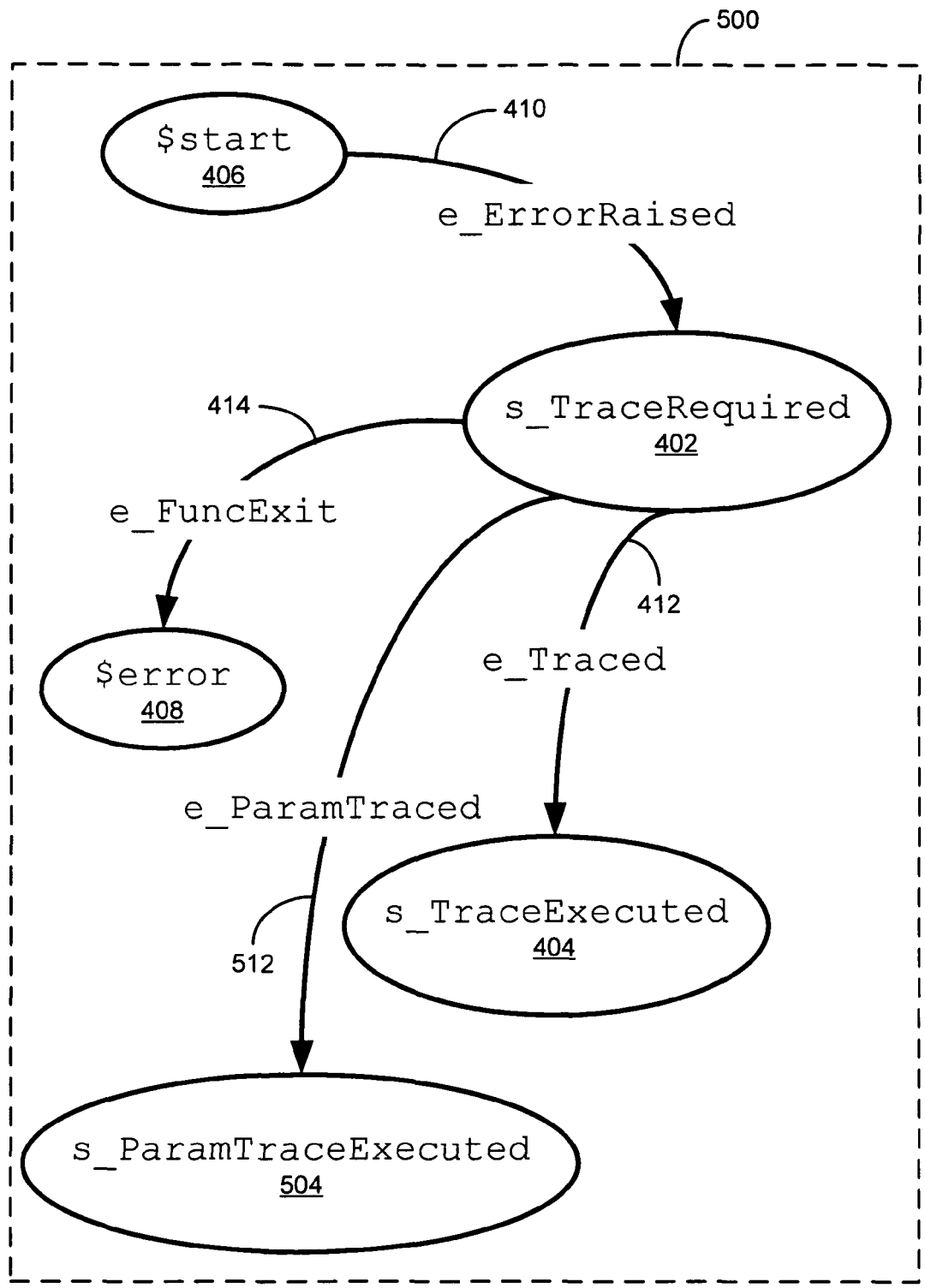
FIG. 5 is a graph of another finite state machine to be implemented by a component of the tool of FIG. 3, according to another embodiment of the invention.

FIG. 5 is a graph of a finite state machine 500 to be implemented by component 308, according to another embodiment of the invention. State machine 500 differs from state machine 400 in that it has an additional explicit state s_ParamTraceExecuted 504 which is terminal, an additional event e_ParamTraced, and a transition 512 from the s_TraceRequired state 402 to the s_ParamTraceExecuted state 504 when the e_ParamTraced event is detected. A logging message indicative of or describing transition 512, for example "Param Trace Executed", is output to file 304. With finite state machine 500 implemented by component 308, error tracing analysis tool 300 is able to determine whether a trace statement identifies the particular error of the detected error path.

In another version of the specific OPAL-based example, specification 310 may include, in addition to the pattern definitions given above, the following definition of finite state machine 500:

```
statemachine Tracing {
    state s_TraceRequired;
    state s_TraceExecuted terminal;
    state s_ParamTraceExecuted terminal;
    event e_ErrorRaised patterns p_FunctionReturnedNtStatus ($1)
        p_FunctionReturnedHresultError ($1)
        p_FunctionReturnedDWORD ($1)
        p_FunctionReturnedHANDLE ($1)
        creation;
    event e_Traced patterns p_TraceNoError( );
    event e_ParamTraced patterns p_Trace($1);
    event e_FuncExit patterns p_Exit( ) $mainonly;
    transition $start to s_TraceRequired on e_ErrorRaised with "Error Raised";
    transition s_TraceRequired to s_TraceExecuted on e_Traced with "Trace Executed";
    transition s_TraceRequired to s_ParamTraceExecuted on e_ParamTraced with "Param Trace Executed";
    transition s_TraceRequired to $error on e_FuncExit with "No error logging! " ;
};
```

In this specific example, the s_TraceExecuted state 404 is reached only if a trace statement that does not identify the error is detected before the end of the error path.

Figure 6:
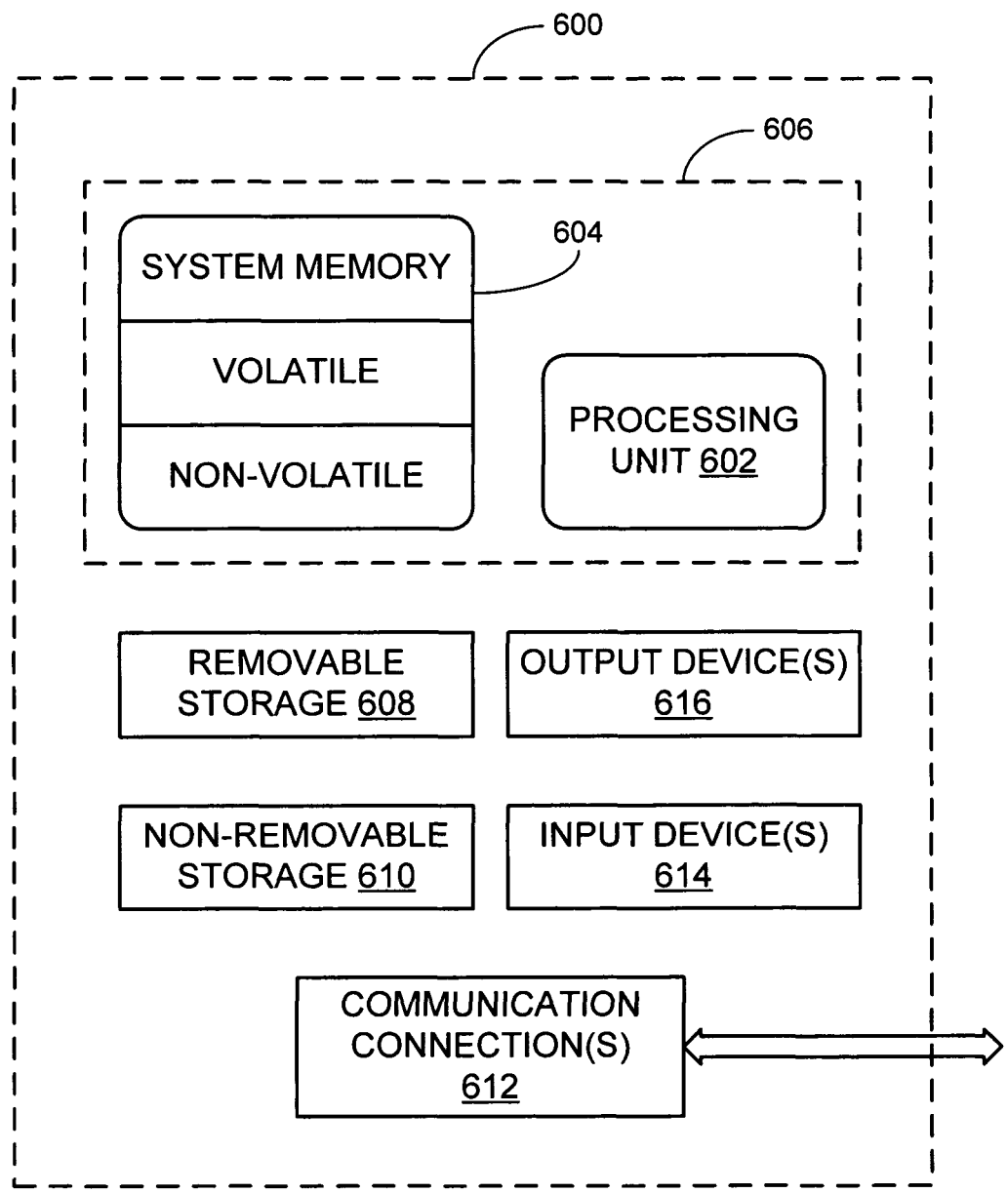
FIG. 6 is an illustration of an exemplary system for implementing embodiments of the invention, the system including one or more computing devices.

FIG. 6 is an illustration of an exemplary system for implementing embodiments of the invention, the system including one or more computing devices, such as computing device 600. In its most basic configuration, device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.) or some combination of the two. This most basic configuration is illustrated in FIG. 6 by dashed line 606.

Additionally, device 600 may also have additional features or functionality. For example, device 600 may also include additional storage (removable and/or non-removable) including, but not limited to, magnetic or optical disks or tape. Such additional storage is illustrated in FIG. 6 by removable storage 608 and non-removable storage 610.

Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600.

Device 600 may also contain communication connection(s) 612 that allow the device to communicate with other devices. Communication connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. The term computer readable media as used herein includes both storage media and communication media.

Device 600 may also have input device(s) 614 such as keyboard, mouse, pen, voice input device, touch input device, etc. Output device(s) 616 such as a display, speakers, printer, etc. may also be included. All these devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for statically analyzing software code, the method comprising:
   automatically detecting a plurality of error paths in said software code, wherein at least one of the automatically detected error path contains at least one trace statement;
   automatically determining that at least one of the automatically detected error paths does not contain any trace statements;
   automatically identifying each of the automatically detected error paths that do not contain any trace statements, and automatically inserting a trace statement into each of the automatically detected error paths automatically identified as not containing any trace statements;
   wherein an error path begins at a point in said software code where an error could be returned from a function called by a current function and ends either where said error is returned by said current function or at a start of another error path that starts before said error is returned by said current function.

2. The method of claim 1, further comprising:
   quantifying an error tracing quality of said software code based on a total number of said detected error paths and a number of said detected error paths that include at least one trace statement.

3. The method of claim 1, further comprising:
   automatically determining whether said trace statement identifies the particular error of the detected error path that includes said trace statement.

4. The method of claim 3, further comprising:
   quantifying an error tracing quality of said software code based on a total number of said detected error paths and a number of said detected error paths that include at least one trace statement that identifies said particular error.

5. The method of claim 1, wherein systematically detecting error paths in said software code comprises:
   matching code constructs in said software code to predefined patterns.

6. One or more non-transitory computer-readable media having computer-executable components comprising:
   a static code analysis engine configured to perform:
   automatically detecting a plurality of error paths in said software code, wherein at least one of the automatically detected error path contains at least one trace statement;
   automatically determining that at least one of the automatically detected error paths does not contain any trace statements;
   automatically identifying each of the automatically detected error paths that do not contain any trace statements, and automatically inserting a trace statement into each of the automatically detected error paths automatically identified as not containing any trace statements;
   wherein an error path begins at a point in said software code where an error could be returned from a function called by a current function and ends either where said error is returned by said current function or at a start of another error path that starts before said error is returned by said current function.

7. The computer-readable media of claim 6, wherein said static code analysis engine comprises:
   a component to implement a finite state machine that is triggered by the detection of a start of an error path, transitions upon detection of a trace statement in said error path, and transitions upon detection of an end of said error path.

8. The computer-readable media of claim 6, wherein said static code analysis engine comprises:
   a component to implement a finite state machine that is triggered by the detection of a start of an error path, transitions upon detection of a trace statement in said error path that identifies an error of said error path, transitions upon detection of a trace statement in said error path that does not identify said error, and transitions upon detection of an end of said error path.

\* \* \* \* \*